(12) United States Patent
Murphy et al.

(10) Patent No.: US 9,503,436 B1
(45) Date of Patent: *Nov. 22, 2016

(54) METHODS AND SYSTEMS FOR NAS DEVICE PAIRING AND MIRRORING

(71) Applicant: Western Digital Technologies, Inc., Irvine, CA (US)

(72) Inventors: John Murphy, Berthoud, CO (US); Daniel J. Wade, Boulder, CO (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/672,484

(22) Filed: Mar. 30, 2015

Related U.S. Application Data

(63) Continuation of application No. 13/491,491, filed on Jun. 7, 2012, now Pat. No. 9,009,525.

(51) Int. Cl.
| | |
|---|---|
| *G06F 11/20* | (2006.01) |
| *H04L 29/06* | (2006.01) |
| *H04L 29/08* | (2006.01) |
| *G06F 11/16* | (2006.01) |

(52) U.S. Cl.
CPC ......... *H04L 63/061* (2013.01); *G06F 11/2056* (2013.01); *H04L 63/0428* (2013.01); *H04L 67/1097* (2013.01); *G06F 11/1612* (2013.01); *G06F 11/2053* (2013.01)

(58) Field of Classification Search
CPC .......... G06F 11/1612; G06F 11/1658; G06F 11/1666; G06F 11/20; G06F 11/2053; G06F 11/2056; G06F 11/2069; G06F 11/2084
See application file for complete search history.

(56) References Cited

U.S. PATENT DOCUMENTS

| | | |
|---|---|---|
| 6,073,220 A | 6/2000 | Gunderson |
| 6,499,054 B1 | 12/2002 | Hesselink et al. |
| 6,732,158 B1 | 5/2004 | Hesselink et al. |
| 7,100,077 B2 | 8/2006 | Saika |
| 7,120,692 B2 | 10/2006 | Hesselink et al. |
| 7,228,438 B2 | 6/2007 | Bushmitch et al. |
| 7,302,579 B1 | 11/2007 | Cain et al. |
| 7,404,051 B2 | 7/2008 | Shitomi |
| 7,421,078 B2 | 9/2008 | Akiyama |
| 7,454,443 B2 | 11/2008 | Ram et al. |

(Continued)

OTHER PUBLICATIONS

READYNAS Instant Storage Using Rsync for NAS-to-NAS Backups, Infrant Technologies, 21 pages.

(Continued)

*Primary Examiner* — Joseph Schell
(74) *Attorney, Agent, or Firm* — Young Law Firm, P.C.

(57) ABSTRACT

One embodiment is a system, comprising a first NAS device, a second NAS device. The first and second NAS devices may be configured to be paired with one another to enable an ongoing secure exchange of content (e.g., files, pictures, movies, audio recordings) and NAS settings (e.g., RAID settings, backup schedules, etc.) between the first and second NAS devices across a network. According to one embodiment, through this ongoing secure exchange of content and NAS settings, the second NAS device may become and may be thereafter maintained as a mirror of the first NAS device, such that the second NAS device may be maintained as a drop-in physical and functional replacement for the first NAS device in the event of a failure of the first NAS device.

21 Claims, 3 Drawing Sheets

(56) References Cited

U.S. PATENT DOCUMENTS

| | | |
|---|---|---|
| 7,467,187 B2 | 12/2008 | Hesselink et al. |
| 7,529,785 B1 | 5/2009 | Spertus et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,694,089 B2 | 4/2010 | Furuhashi et al. |
| 7,701,705 B1 | 4/2010 | Szeremeta |
| D621,282 S | 8/2010 | Yagi |
| 7,788,404 B2 | 8/2010 | Hesselink et al. |
| 7,802,131 B2 * | 9/2010 | Watanabe ............ G06F 11/2069 714/6.11 |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,032,702 B2 * | 10/2011 | Grimes ............... G06F 11/1469 711/114 |
| 8,064,194 B2 | 11/2011 | Szeremeta |
| 8,113,873 B1 | 2/2012 | Sarraf |
| 8,133,426 B1 | 3/2012 | Yurchenco et al. |
| 8,171,337 B2 * | 5/2012 | Peters ............... G06F 17/30587 709/214 |
| 8,218,770 B2 * | 7/2012 | Arulambalam ......... G06F 21/72 380/277 |
| 8,224,248 B2 | 7/2012 | Demirbasa et al. |
| 8,225,109 B1 * | 7/2012 | Kalligudd ............ G06F 11/1456 380/255 |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,358,395 B1 | 1/2013 | Szeremeta |
| 8,417,979 B2 | 4/2013 | Maroney |
| 8,462,460 B1 | 6/2013 | Szeremeta et al. |
| 8,498,088 B1 | 7/2013 | Klein |
| 8,526,798 B2 | 9/2013 | Hesselink |
| 8,547,658 B1 | 10/2013 | Szeremeta |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| D707,667 S | 6/2014 | Kono et al. |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,856,293 B1 | 10/2014 | Sadry |
| 2003/0051135 A1 * | 3/2003 | Gill ..................... H04L 63/04 713/160 |
| 2004/0010732 A1 | 1/2004 | Oka |
| 2004/0136224 A1 | 7/2004 | Hamer et al. |
| 2005/0144195 A1 | 6/2005 | Hesselink et al. |
| 2005/0144200 A1 | 6/2005 | Hesselink et al. |
| 2006/0236048 A1 * | 10/2006 | Deguchi ............ G06F 11/2069 711/162 |
| 2008/0115008 A1 * | 5/2008 | Daftardar ............ G06F 11/2092 714/3 |
| 2008/0126446 A1 | 5/2008 | Brunet et al. |
| 2008/0250215 A1 * | 10/2008 | Shitomi .............. G06F 11/1662 711/162 |
| 2009/0077134 A1 * | 3/2009 | Ueoka ................. G06F 11/1662 |
| 2010/0058054 A1 | 3/2010 | Irvine |
| 2010/0299518 A1 | 11/2010 | Viswanathan et al. |
| 2012/0036041 A1 | 2/2012 | Hesselink |
| 2012/0089863 A1 * | 4/2012 | Goto ................... G06F 11/2035 714/4.11 |
| 2012/0117555 A1 | 5/2012 | Banerjee et al. |
| 2012/0246511 A1 | 9/2012 | Sato |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173215 A1 | 6/2014 | Lin et al. |

OTHER PUBLICATIONS

Resetting to Factory Defaults by Steuys, published by READYNAS.com, Jan. 1, 2012. http://www.readynas.com/forum/viewtopic.

John Murphy, et al., U.S. Appl. No. 13/491,491, filed Jun. 7, 2012, 17 pages.

Office Action dated Mar. 28, 2014 from U.S. Appl. No. 13/491,491, 16 pages.

Office Action dated Oct. 10, 2014 from U.S. Appl. No. 13/491,491, 14 pages.

Notice of Allowance dated Dec. 23, 2014 from U.S. Appl. No. 13/491,491, 6 pages.

\* cited by examiner

METHODS AND SYSTEMS FOR NAS DEVICE PAIRING AND MIRRORING

CROSS REFERENCE TO RELATED APPLICATIONS

This application is a continuation of U.S. patent application Ser. No. 13/491,491, filed on Jun. 7, 2012, which is hereby incorporated by reference in its entirety.

BACKGROUND

Online backup services like Mozy® and Carbonite® provide consumers with remote data backup. However, these services require a monthly fee and users do not have physical access to their backup media. Moreover, in the event of a failure of their backed up storage device, consumers subscribing to such services are forced to carry out a restore procedure that does not restore a mirror image of their failed drive and that can be quite lengthy. Indeed, even using a high speed connection, restoring an entire drive can take hours, especially if the backed up content includes rich media.

What are needed, therefore, are methods and systems that do not suffer from the aforementioned disadvantages.

DETAILED DESCRIPTION

One embodiment solves the problem of safeguarding data in one location from physical damage by mirroring that data on another network connected storage device, using two (or more) paired NAS devices. The pairing of one NAS device to another identical or similar NAS device may comprise exchanging security and communication information, to enable one of the NAS devices to securely send content and NAS settings to the other NAS device across a potentially unsecure computer network. The security information may comprise, for example, an encryption key or keys and the communication information may comprise, for example, network addresses of one or more of the NAS devices. The pairing functionality may be integrated into the NAS device by, for example, incorporating such functionality into the NAS devices' firmware. According to one embodiment, such pairing and mirroring functionality may be carried out with ease, relative to existing solutions, even by relatively less technologically-savvy users.

One embodiment is a system comprising a first NAS device and a second NAS device. The first and second NAS devices may be configured to be paired with one another to enable an ongoing secure exchange of content (e.g., files, pictures, movies, audio recordings, applications, application data and settings) and NAS settings (e.g., RAID settings, backup schedules, etc.) between the first and second NAS devices across a network. According to one embodiment, through this ongoing secure exchange of content and NAS settings, the second NAS device becomes and is thereafter maintained as a mirror of the first NAS device, such that the second NAS device is maintained as a drop-in physical and functional replacement for the first NAS device in the event of a failure of the first NAS device. According to one embodiment, the terms "mirror" and "mirroring" comprises reproducing all or substantially all data stored on a first NAS device on a second device NAS device, such that the file system, user files, content and settings as well as the NAS settings stored on the first NAS device are collectively reproduced identically or near identically on the second NAS device to enable the second NAS device to act as a drop-in physical and functional replacement for the first NAS device. For example, the content and NAS settings mirrored on the second NAS device may not be compressed on the second NAS device, unless they are so compressed on the first NAS device. The directory structures stored in the first NAS device, through such mirroring, may be preserved and stored in non-compressed and optionally non-encrypted format that is readily accessible and readable by suitable user applications accessing the second NAS device when it is pressed into service following the failure of the first NAS device or the removal thereof for other reasons.

Figure 1:
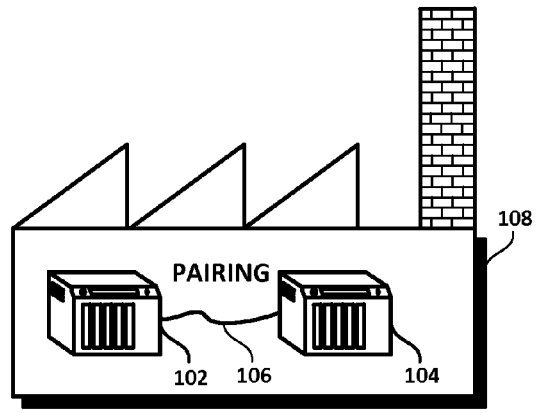
FIG. 1 shows a first and a second network attached storage (NAS) device being paired to one another, according to an embodiment.

The pairing of the first NAS device with the second NAS device may be accomplished in a number of different ways. FIG. 1 shows one embodiment in which a first NAS device 102 and a second NAS device 104 are paired to one another at a factory 108, according to an embodiment. It is to be understood, however, that reference 108 may denote the user's home or place of employment. Through this process, the first and second NAS devices 102, 104 may be factory pre-configured as a matched pair of NAS devices. The first and second NAS devices 102, 104 may thereafter be sold as a matched pair of NAS devices. According to one embodiment, a matched pair of NAS devices may be configured to exchange user content and NAS settings exchanged unidirectionally; that is, from the first NAS device to the second device, which may then be maintained as a mirror of the first NAS device. According to one embodiment, the user content and NAS settings may be exchanged bidirectionally, such that the content and settings stored in each are mirrored in the other.

The pairing 106 shown in FIG. 1 may comprise the exchange, between the first NAS device 102 and the second NAS device 104, of security and communication information. For example, the security information may comprise an encryption key or keys and the communication information may comprise, for example, network addresses of the NAS devices 102, 104. The security key or keys exchanged between the first and second NAS devices may be generated by most any secure hashing algorithm. For example, the SHA-1 ("secure hash algorithm 1") cryptographic hash function may be used to generate the cryptographic key or keys that enable the first NAS device 102 to encrypt the user content and NAS settings and to send the encrypted user content and settings to the second NAS device 104 over a secure or unsecured network. The second NAS device 104 may then decrypt the encrypted user content and settings for internal storage. Alternatively, the second NAS device 104 may store the received user content and settings in encrypted form. SHA-1 was designed by the United States National Security Agency (NSA) and published by the United States NIST as a U.S. Federal Information Processing Standard. Another example of a suitable hashing algorithm is SHA-2, which is a set of cryptographic hash functions (SHA-224, SHA-256, SHA-384, SHA-512) also designed by the NSA and published in 2001 by the NIST. SHA-2 is thought to include a significant number of changes from its predecessor, SHA-1. At the present time, SHA-2 consists of a set of four hash functions with digests that are 224, 256, 384 or 512 bits in length. Other hash algorithms may be used to generate the security information utilized to encrypt the user content and NAS settings, as those of skill may recognize. The thus generated security information, generated for (and optionally within) the first NAS device 102 may then copied to the second NAS device 104, to enable the later to decrypt user content and NAS settings sent thereto by the first NAS device 102.

As suggested at 106 in FIG. 1, such copying of the security information may be carried out via a wired connection or through other structures or functionality, such as a wireless coupling between the first and second NAS devices 102, 104, such as near a Near-Field Communication (NFC) protocol or through a Wi-Fi connection, for example. The thus paired first and second NAS device 102, 104 may then be packaged together and sold as a matched pair of NAS devices, thereby facilitating their deployment by the user.

Figure 2:
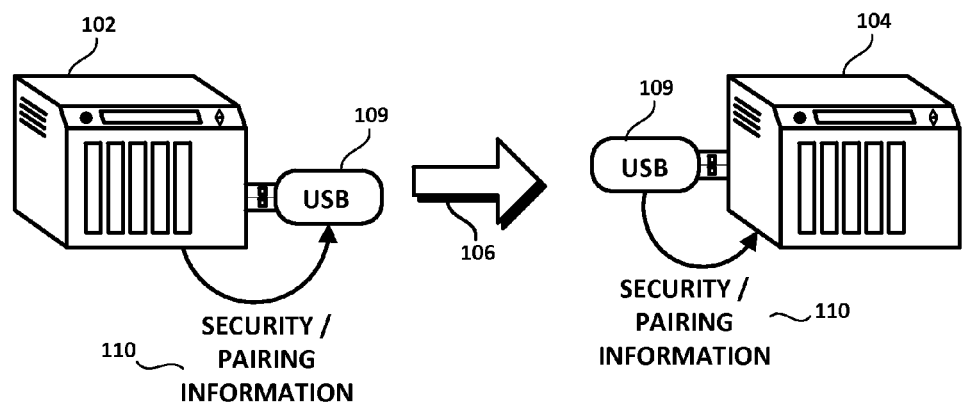
FIG. 2 is a diagram of a first NAS device and a second NAs device being paired via a USB memory storage device or equivalent portable storage device, according to one embodiment.

According to one embodiment, the first and second NAS devices 102, 104 need not be paired together at the factory 108. Instead, the user may purchase two identical or similar NAS devices 102, 104 and perform the pairing operation him or herself after purchase. FIG. 2 shows one possible method of carrying out such pairing. Indeed, FIG. 2 is a diagram of a first NAS device 102 and a second NAs device 104 being paired via a USB memory storage device 109 or equivalent portable storage device, according to one embodiment. As shown in FIG. 2, security and pairing information 110, whether generated by the first NAS device 102 or loaded thereon from an external source, may be stored on a USB storage device 109 or some other external and portable storage. The USB device 109 may then be physically ported to and plugged into a USB slot of the second NAS device 104 and copied thereto. This pairing operation enables the second NAS device 104 to decrypt the encrypted information sent by the first NAS device 102 and enables the first and second NAS devices 102, 104 to securely communicate over secured or unsecured (e.g., the Internet) networks. Alternatively, each of the first and second NAS devices 102, 104 may auto-discover the user's wireless or wired home network and automatically or with minimal user input, pair themselves to enable the mirroring functionality described above.

Figure 3:
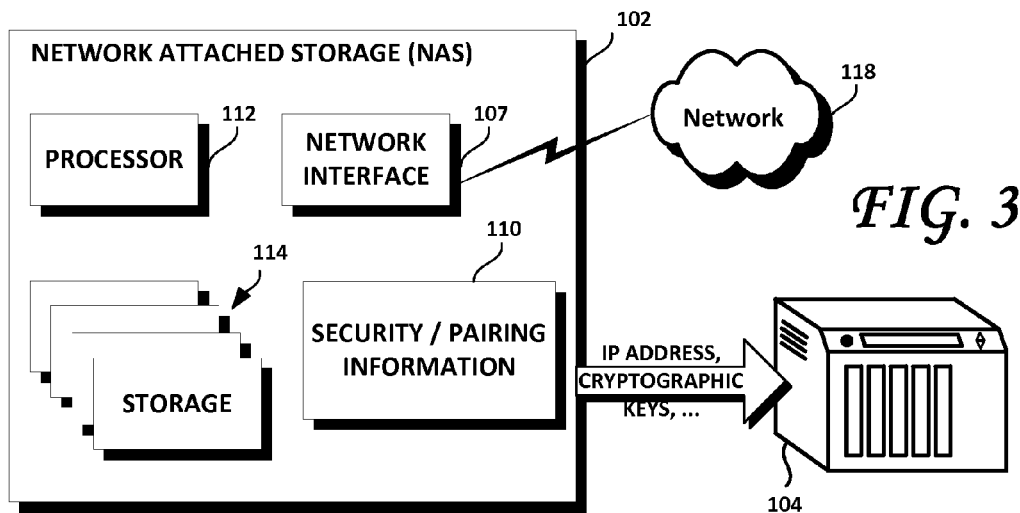
FIG. 3 is a block diagram of a NAS device, according to one embodiment.

FIG. 3 comprises a block diagram of a NAS device 102, according to one embodiment. As shown, the NAS device 102 may comprise a processor 112, storage 114 and a network interface 107 configured to enable the NAS device 102 to connect to a network 118 such as the user's Local Area Network (LAN) and/or the Internet. The storage 114 may comprise one or more disk drives and/or solid state storage. The NAS device 102 may also store security and pairing information 110, configured to enable the NAS device 102 to couple to and pair with the second NAS device 104. The pairing operation may be carried wirelessly, with the first and second NAS device 102, 104 automatically recognizing each other and exchanging the security and pairing information 110 wirelessly. For example, the first NAS device 102 may provide the second NAS device 104 not only with the encryption key, but also with its network IP address. When the second NAS device 104 is thereafter physically transported away from the first NAS device 102 and coupled to a network, it will then be able to connect with the first NAS device 102 at the IP address provided to it during the pairing process, to enable the initiation and thereafter ongoing exchange of information to enable the second NAS device 104 to become and be maintained as a mirror of the first NAS device 102. It is to be noted that the second NAS device 104 may have a different Media Access Control address (MAC address) than the first NAS device 102, but such does not pose any special problems when the second NAS device 104 is eventually pressed into service as a drop-in replacement for the first NAS device 102. The cryptographic protocol employed by the first and second NAS device 102, 104 may be independent of any security protocol implemented by the communication channel between the first and second NAS devices 102, 104. The security protocol implemented by the communication channel may comprise, for example, Transport Layer Security (TLS) or Secure Sockets Layer (SSL), which are cryptographic protocols that provide communication security over the Internet. TLS and SSL encrypt the segments of network connections at the Transport Layer, using asymmetric cryptography for key exchange, symmetric encryption for privacy, and message authentication codes for message integrity. It is to be understood that any suitable communication protocol and channel may be used to exchange the security and pairing information 110, as will be recognized by those of skill in this art. Moreover, Linux commands such as tar, cron, rsync, ftp, and ssh (secure shell), for example, may be used to implement the mirroring functionality described and shown herein.

Figure 4:
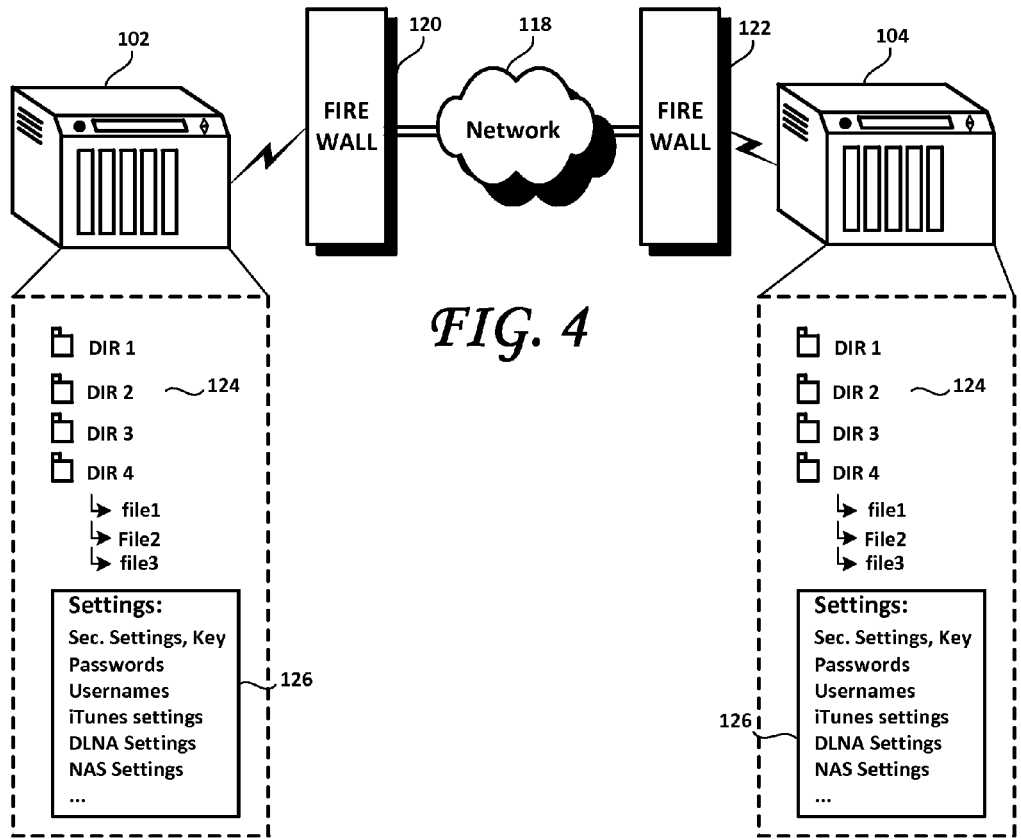
FIG. 4 is a block diagram of a first NAS device and a second NAS device that is maintained as a mirror of the first NAS device across a network such that the second NAS device is maintained as a drop-in physical and functional replacement for the first NAS device in the event of a failure of the first NAS device, according to one embodiment.

FIG. 4 is a block diagram of a system according to one embodiment. FIG. 4 shows a first NAS device 102 and a second NAS device 104 that is maintained as a mirror of the first NAS device 102 across a network 118 such that the second NAS device 104 is maintained as a drop-in physical and functional replacement for the first NAS device 102 in the event of a failure of the first NAS device 102, according to one embodiment. As shown therein, the first NAS device 102 may access the network 118 through a first firewall 120 and the second NAS device 104 may access the network 118 through a second firewall 122. As shown, the first NAS device 102 may store user content in the form of, for example, a file directory structure 124 comprising a plurality of directories (Dir 1, Dir 2, Dir 3 and Dir 4) and/or a plurality of files, such as shown at file1, file2, file3. The first NAS device 102 may also store a plurality of settings 126, such as security settings, cryptographic keys, usernames and passwords. The first NAS device may also store user application settings such as, for example, iTunes® settings. Other settings may comprise, for example, home networking settings such as DLNA settings. The first NAS 102 may also store settings for the first NAS 102 itself such as frequency of mirroring updates, schedules, and the like. As shown, the second NAS device 104 may be configured to mirror of the first NAS device 102 across the network 118 such that the second NAS device 104 is maintained as a drop-in physical and functional replacement for the first NAS device 102 in the event of a failure of the first NAS device 102. Such mirroring is shown in FIG. 4, where both the file and directory structure 124 and the settings stored by the second NAS device 104 may be identical (from at least the user's point of view) as the file and directory structure 124 and settings 126 stored in the first NAS device 102.

Figure 5:
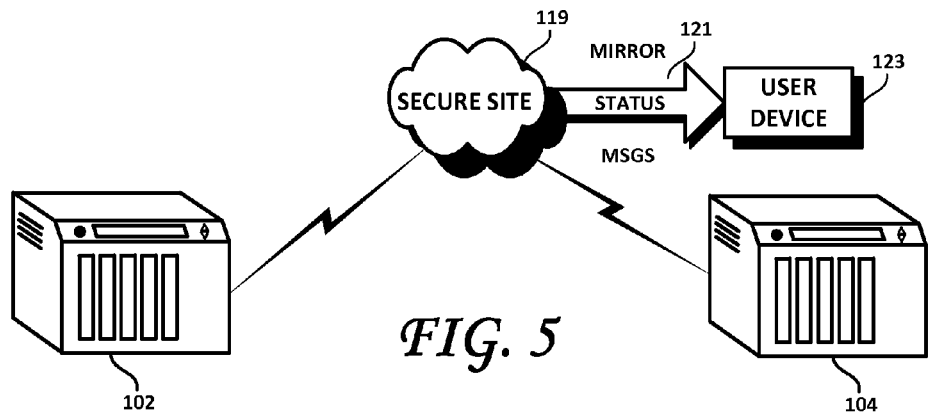
FIG. 5 is a block diagram of a first NAS device and a second NAS device that is maintained as a mirror of the first NAS device using a secure computer site such that the second NAS device is maintained as a drop-in physical and functional replacement for the first NAS device in the event of a failure of the first NAS device, according to one embodiment.

FIG. 5 is a block diagram of a first NAS device 102 and a second NAS device 104 that is maintained as a mirror of the first NAS device 102 using a secure computer site 119 such that the second NAS device 104 is maintained as a drop-in physical and functional replacement for the first NAS device 102 in the event of a failure of the first NAS device 102, according to one embodiment. As suggested above, pairs of NAS devices 102, 104 may exchange cryptography keys and settings information at the factory or point of sale and may, thereafter, be sold as a paired set. Alternatively, each of the first and second NAS devices may be configured to access a secure site 119 on a computer network to enable the exchange of such cryptographic keys, user content and settings. For example, a network service such as Western Digital's MioNet (www.mionet.com) may be accessed by both first and second NAS devices 102, 104 to enable the ready exchange of such information. As also shown in FIG. 5, the secure site 119 may be configured to generate and send status messages 121 to one or more selected user devices 123. Such messages may alert the user as to the status of the mirroring between the first and second NAS devices 102, 104, as well as any relevant messages of interest to the user relative to their first and second NAS devices 102, 104. For example, such status messages 121 may alert the user of any failure of the second NAS device 104, or any other condition which may jeopardize the mirroring of the user content and settings between the first and second NAS devices 102, 104. Alternatively, such status messages 121 may be generated and sent by the first NAS device 102 and/or the second NAS device 104.

To use such secure site 119, the user may connect thereto, and follow prompts of an online registration process prompts to identify and register the first and/or second NAS devices 102, 104. According to one embodiment, the first and second NAS devices 102, 104 may be configured to contact and identify themselves to the secure site 119. The first and second NAS devices may be configured to, during the online registration process, exchange cryptographic keys and settings to enable the ongoing secure exchange of content and NAS settings, either through the secure site 119 or directly with one another through a network, such as network 118 of FIG. 4. Alternatively, according to one embodiment, each of the first and second NAS devices 102, 104, optionally already paired with one another, may be configured to independently access the secure site 119 and exchange cryptographic keys and settings to enable the ongoing secure exchange of content and NAS settings either through the secure site 119 or independently thereof. According to one embodiment, the mirroring may be carried out bi-directionally (allowing the NAS devices 102, 104 to mirror each other). According to another embodiment, the mirroring may be configured such that the second NAS device 104 mirrors the first NAS device 102.

Figure 6:
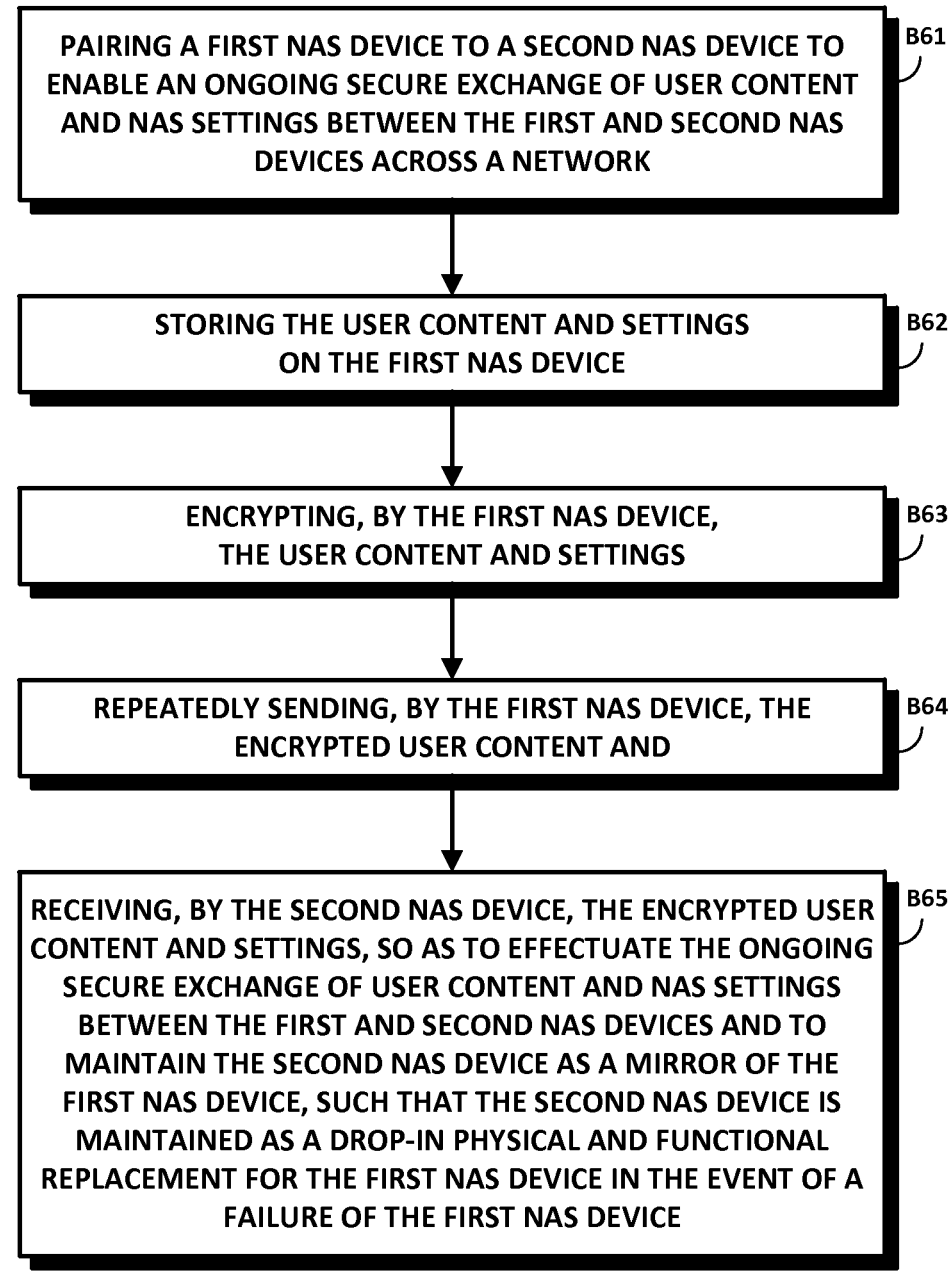
FIG. 6 is a flowchart of a method according to one embodiment.

FIG. 6 is a flowchart of a method according to one embodiment. As shown therein, Block B61 calls for pairing a first NAS device to a second NAS device to enable an ongoing secure exchange of user content and NAS settings between the first and second NAS devices across a network. The user content and settings may then be stored on the first NAS device, as called for at Block B62. At least the user content and settings may be encrypted by the first NAS device as shown at B63 and repeatedly sent, by the first NAS device, to the second NAS device, as called for by Block B64. As shown at B65, the second NAS device may then receive the encrypted user content and settings, so as to effectuate the ongoing secure exchange of user content and NAS settings between the first and second NAS devices and to maintain the second NAS device as a mirror of the first NAS device, such that the second NAS device is maintained as a drop-in physical and functional replacement for the first NAS device in the event of a failure of the first NAS device.

Advantageously, one embodiment offers what may be characterized as local offsite backup and mirroring functionality. Indeed, upon failure of the first NAS 102, the user may travel to the local offsite backup location where the second NAS device is located, and bring the second NAS device back, and couple the second NAS device to a user device and/or network in place of the failed first NAS device, such that the second NAS device is effectively a drop-in replacement for the failed first NAS device with little or no configuration. The second NAS device may be configured to "unslave" itself from the failed first NAS and/or be configured to thereafter act as the primary NAS device. According to one embodiment, a replacement second NAS device may then be purchased by the user and configured, in one of the manners described above, to pair itself with the second NAS device that has now been configured as the "new" first NAS device. Thereafter, the replacement second NAS device may be configured to be maintained as a mirror of the new first NAS device such that the replacement second NAS device is maintained as a drop-in physical and functional replacement for the new first NAS device in the event of a failure of the new first NAS device.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures and functionalities (such as, for example, the structure of the NAS devices, the communication protocols employed and the degree of user input during the registration and NAS device pairing initiation) may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A system, comprising:
    a first network attached storage (NAS) device; and
    a second NAS device,
    the first and second NAS devices being paired with one another through an exchange of security keys and pairing information between the first and second NAS devices to enable an ongoing secure exchange of content and NAS settings between the first and second NAS devices across a network,
    wherein, through the ongoing secure exchange of content and NAS settings, the second NAS device becomes and is thereafter maintained as a mirror of the first NAS device.

2. The system of claim 1, wherein the security keys comprise matching security keys to enable the ongoing secure exchange of content and NAS settings.

3. The system of claim 1, wherein the security keys and the pairing information are factory pre-configured such that the first and second NAS devices are factory pre-configured as a matched pair of NAS devices.

4. The system of claim 1, wherein the security keys and the pairing information are generated by at least one of the first NAS device, the second NAS device and an external source.

5. The system of claim 1, wherein the first and second NAS devices are configured to require an online registration process and wherein during the online registration process, the first and second NAS devices are configured to exchange security information to enable the ongoing secure exchange of content and NAS settings.

6. The system of claim 1, further comprising an online secure site and wherein the first and second NAS devices are configured to connect to the online secure site to securely exchange the content and NAS settings.

7. The system of claim 1, wherein the first NAS device, using the exchanged security keys, is configured to:
    encrypt the content and NAS settings; and
    send the encrypted content and NAS settings to the second NAS device.

8. The system of claim 7, wherein the second NAS device, using the exchanged security keys, is configured to:
    receive the encrypted content and NAS settings from the first NAS device; and
    decrypt the received encrypted content and NAS settings.

9. The system of claim 1, further comprising a removable storage configured to couple to the first and second NAS devices in turn to provide each NAS device with matching security keys to enable the ongoing secure exchange of content and NAS settings.

10. The system of claim 1, wherein at least one of the first and the second NAS devices is configured to generate and send a user message over the network reporting on a state of a mirroring between the first and second NAS devices.

11. The system of claim 1, wherein the first NAS device comprises a first disk drive and wherein the second NAS device comprises a second disk drive.

12. The system of claim 1, wherein the first NAS device comprises a first solid state storage device and wherein the second NAS device comprises a second solid state storage device.

13. The system of claim 1, wherein the first NAS device comprises a first hybrid storage device comprising a first solid state storage device and a first disk drive and wherein the second NAS device comprises a second solid state storage device and a second disk drive.

14. A method, comprising:
    storing first security keys and first pairing information in a first network attached storage (NAS) device and second security keys and second pairing information in a second NAS device;
    pairing the first NAS device to the second NAS device using the first and second security keys and the first and second pairing information to enable an ongoing secure exchange of user content and NAS settings between the first and second NAS devices across a network;
    storing the user content and NAS settings on the first NAS device;
    encrypting, by the first NAS device, the user content and NAS settings;
    repeatedly sending, by the first NAS device, the encrypted user content and NAS settings as the user content and NAS settings are created or changed; and
    receiving, by the second NAS device, the encrypted user content and NAS settings, so as to effectuate the ongoing secure exchange of user content and NAS settings between the first and second NAS devices and to maintain the second NAS device as a mirror of the first NAS device.

15. The method of claim 14, wherein the first and second security keys are matching security keys to enable the ongoing secure exchange of content and NAS settings.

16. The method of claim 14, wherein pairing comprises factory pre-configuring the first and second NAS devices as a matched pair of NAS devices.

17. The method of claim 14, further comprising:
    configuring the first and second NAS devices to require an online registration process, and
    exchanging, during the online registration process, security information between the first and second NAS devices to enable the ongoing secure exchange of content and NAS settings.

18. The method of claim 14, further comprising the first and second NAS devices connecting to an online secure site to securely exchange the content and NAS settings.

19. The method of claim 14, further comprising at least one of the first and the second NAS device generating and sending a user message over the network reporting on a state of a mirroring between the first and second NAS devices.

20. A system, comprising:
    a first network attached storage (NAS) device; and
    a second NAS device,
    the first NAS device and the second NAS device being factory pre-configured as an associated pair of NAS devices such that the first and second NAS devices are paired with one another to enable an ongoing secure exchange of content and NAS settings between the first and second NAS devices across a network,
    wherein, through the ongoing secure exchange of content and NAS settings, the second NAS device becomes and is thereafter maintained as a mirror of the first NAS device.

21. A method, comprising:
    factory pre-configuring a first network attached storage (NAS) device and a second NAS device as an associated pair of NAS devices to enable an ongoing secure exchange of user content and NAS settings between the first and second NAS devices across a network and configuring the first NAS device and the second NAS device to enable:
        storing the user content and NAS settings on the first NAS device;

encrypting, by the first NAS device, the user content and NAS settings;

repeatedly sending, by the first NAS device, the encrypted user content and NAS settings as the user content and NAS settings are created or changed; and receiving, by the second NAS device, the encrypted user content and NAS settings, so as to effectuate the ongoing secure exchange of user content and NAS settings between the first and second NAS devices and to maintain the second NAS device as a mirror of the first NAS device.

\* \* \* \* \*